INVENTORS:
ROBERT G. LETOURNEAU
CHARLES C. ROE

BY Lyon & Lyon
AGENT

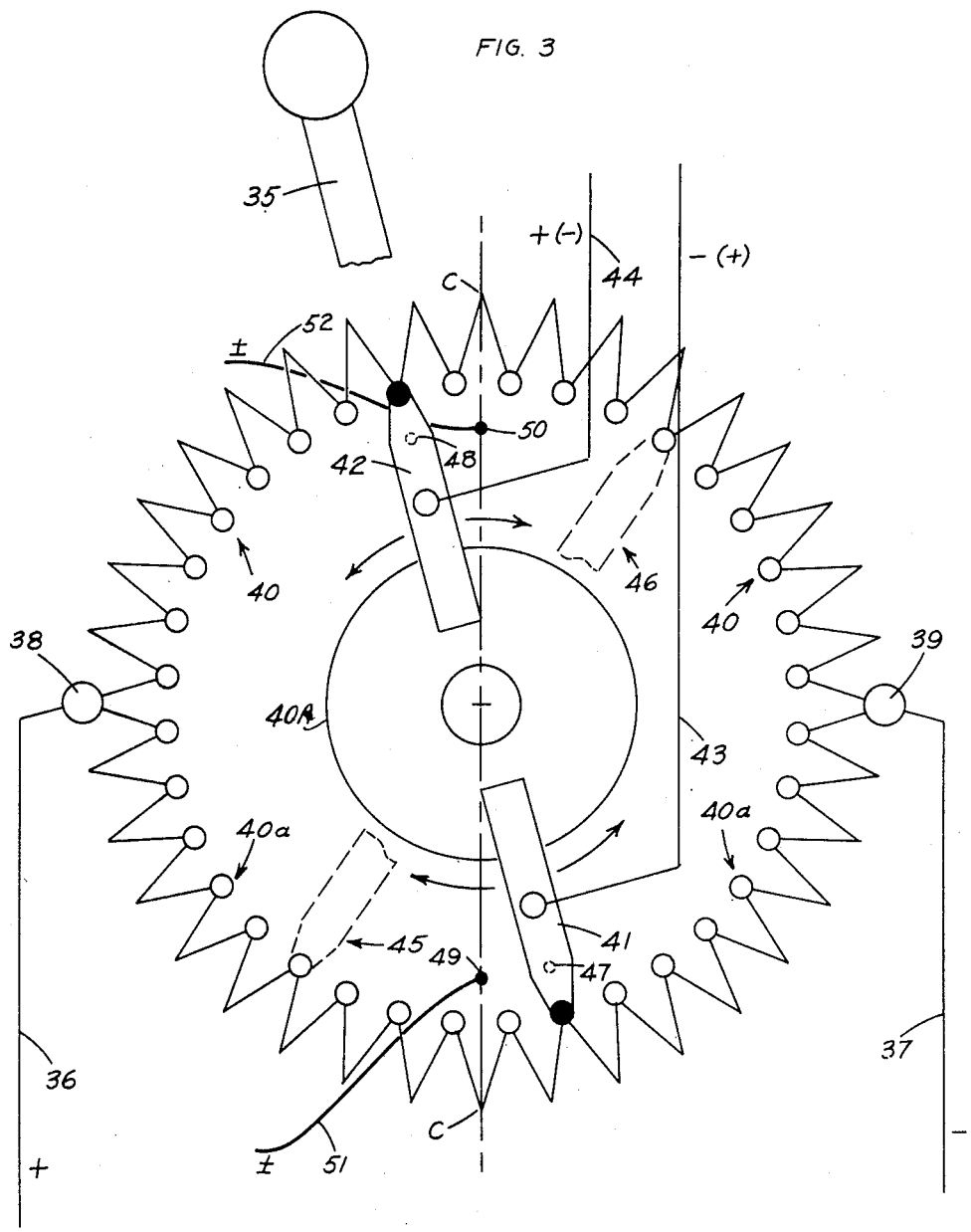

United States Patent Office 2,787,331
Patented Apr. 2, 1957

2,787,331
SELECTIVELY REVERSIBLE MOTOR CONTROL FOR ELECTRICALLY DRIVEN TRACTOR

Robert G. LeTourneau and Charles C. Roe, Longview, Tex.

Original application August 22, 1949, Serial No. 111,658, now Patent No. 2,698,919, dated January 4, 1955. Divided and this application January 7, 1954, Serial No. 402,769

5 Claims. (Cl. 180—6.5)

This invention relates to heavy duty construction tractors and more particularly to the type equipped with a blade for bulldozing operations. This application is a division of our copending application, Serial No. 111,658 filed August 22, 1949, now Patent No. 2,698,919, issued January 4, 1955.

The primary object of this invention is to provide a tractor of this type in which all of its functions are electrically powered and controlled, i. e., wheel drive, steering and blade hoist.

Another object is to provide a tractor in which an internal combustion engine drives a two circuit generator, each circuit of which supplies power to the wheels on the same side to permit electric steering control.

A still further object is to provide a tractor which contains novel individual self-contained wheel driver units which can be readily replaced in the field and returned to the shop for repair.

Yet another object is to provide a structure for a bulldozing tractor in which the operator's cab is above and partially overhanging the blade control A frame so that no part of this frame interferes with his front vision.

These objects are accomplished by means of such structure and relative arrangement of parts as will appear by a perusal of the following specifications and claims.

In the drawings:

Figure 3 is a schematic of the potentiometer control circuit.

Figure 1:
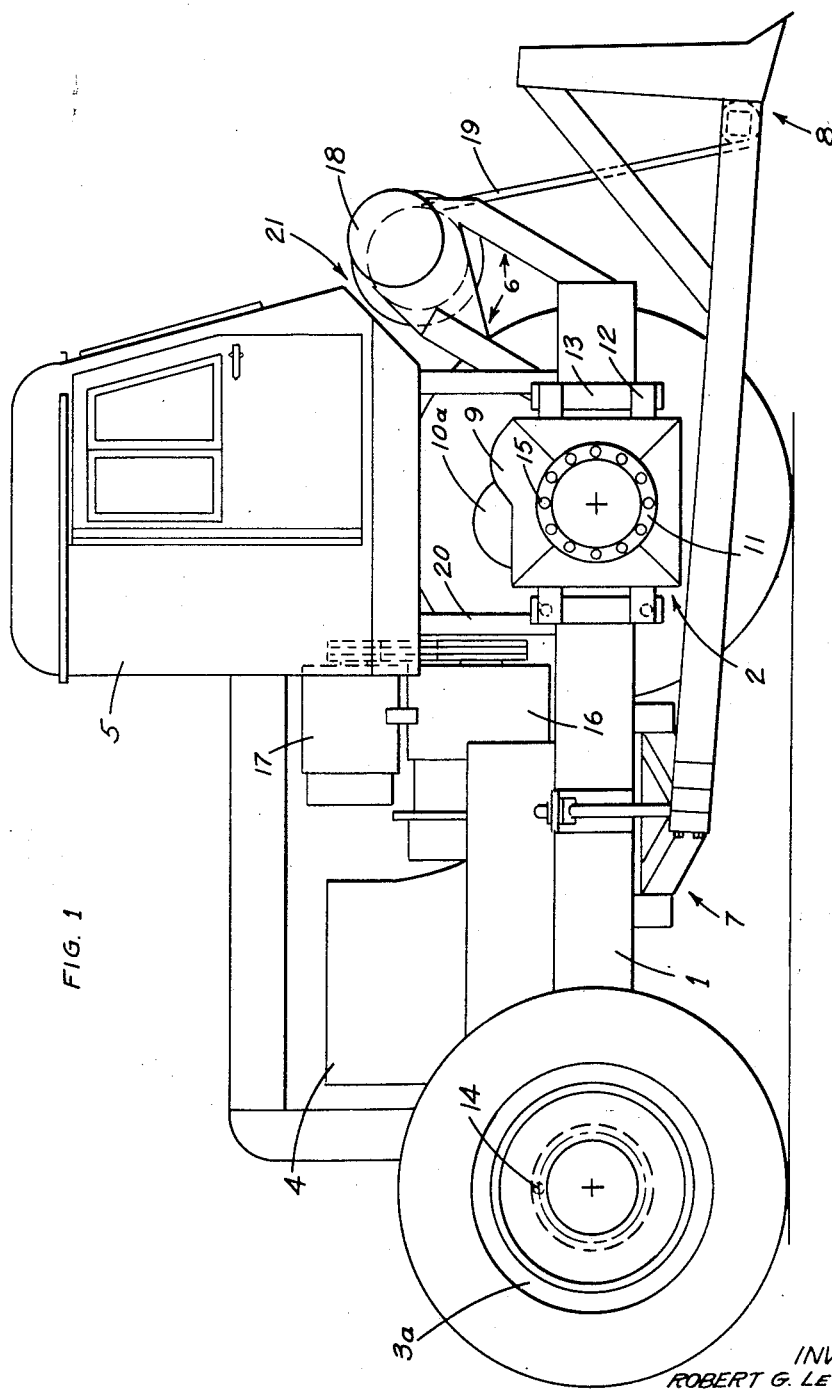
Figure 1 is a side elevation, with the right-front wheel removed, of this electric tractor showing the relative location of its parts.

Referring now to the drawing, in Figure 1 the tractor is seen to consist of a main frame 1, on which are removably mounted four wheel drivers 2 attached to and driving four pneumatic tired wheels 3a (and 3), an internal combustion engine 4 equipped with a radiator and hood, a cab 5, a hoist frame 6, a bulldozer blade mount 7, and an attached bulldozer blade unit 8.

The wheel drivers 2 amount to an enclosed gear box 9, on which is mounted an electric motor 10a (and 10) and from which projects a flanged drive shaft 11. The wheel drivers also include mounting arms 12 for attachment to vertical mounting pads 13 which are welded to frame 1. Wheels 3a and 3 include a bolt circle 14 which aligns with the tapped holes 15 of flanged shaft 11 for mounting thereto. It will be seen that the wheel drivers 2, by this construction, may be readily removed in the field and replaced or returned to a shop for maintenance.

On this all-electric machine the purpose of internal combustion engine 4 is solely to drive the large main generator 16 and exciter generator 17 both of which are D. C. machines, and which together supply electrical current for all of the operations and functions of the tractor. The exciter generator 17 is driven by the engine 4 through shaft 24 and belt 24a.

Hoist frame 6 is attached to frame 1 and supports an electric winch 18 which controls cable 19 and its attached blade unit 8 for the raising and lower thereof. This winch 18 is so positioned by the hoist frame 6 that it fits within an undercut portion 21 of cab 5. The hoist frame 6 attaches to the main frame at points within the projected base of cab 5, due to its elevation from the main frame on stilts 20. By this positioning, the hoist frame and winch are well out of the normal line of vision of an operator seated within the cab.

Figure 2:
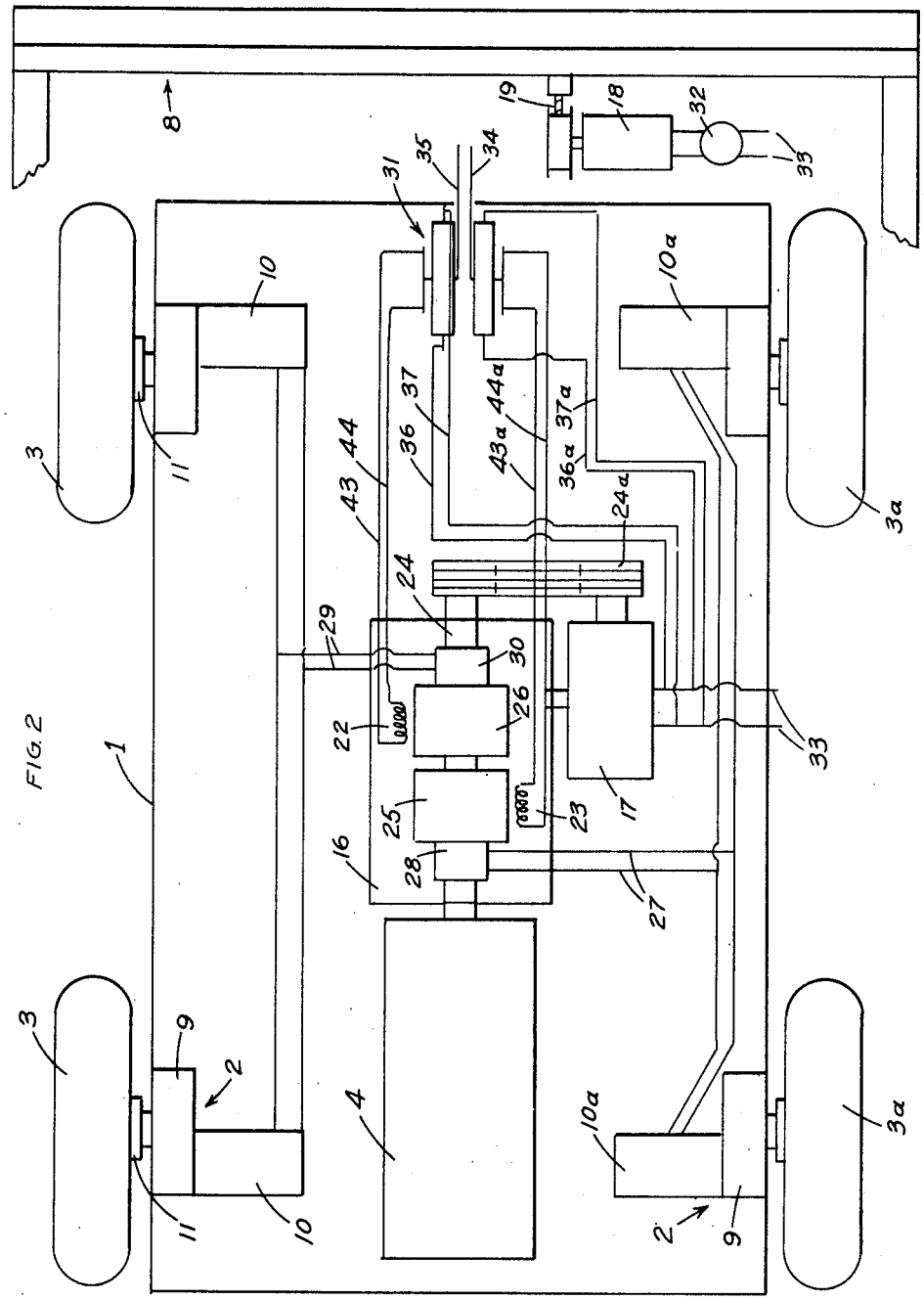
Figure 2 is a plan view in schematic showing the electrical circuit.

Referring to Figure 2, the electrical circuit of this machine is seen to include a two circuit main generator 16 equipped with two field windings 22 and 23, and containing a single rotor shaft 24 on which are two armatures 25 and 26. The output leads 27 connected through a commutator 28 from armature 25 carry current to the drive motors 10a on the right side of the vehicle. Output leads 29 from commutator 30 of armature 26 carry this current to the drive motors 10 on the left hand side. Now by means of a dual potentiometer control 31 the amount of current from the exciter generator 17 to field coils 22 and 23 of generator 16 is positively controlled. It will be recognized that the amount of current supplied to the field coils will determine the amount of current produced in the generator armatures for a given speed of rotation.

The exciter generator 17 is turning and putting out current at all times that the engine 4 is running. Likewise main generator shaft 24 is turning. However, the main generator puts out no current unless field 22 or 23 is energized. Then the current output from armatures 25 or 26 is proportional to the input current to their respective field windings. Generator 17 also supplies current direct to the blade hoist winch 18 through a suitable control switch 32 and leads 33.

With this arrangement, if it is desired to steer to the right, considering the vehicle is at a stand-still and levers 34 and 35 are in their neutral position, the left lever 35 is pushed forward. This will permit current of a polarity to cause ultimate forward motion to be supplied the wheels on the left side. Since the right wheel motors are receiving no current, they will slide or pivot in response to the turning motion imparted to the vehicle by the driving left wheels. If the vehicle is in forward motion, both levers will be forward to the same degree depending on the speed desired; if a turn is now desired to the right, the right hand lever is pulled back toward neutral until the desired degree and speed of turning are accomplished. It is even possible to have the wheels on one side in forward motion and the wheels on the opposite side in reverse for a very sharp turn.

The potentiometer 31 may be examined in more detail by reference to Figure 3. This figure represents a schematic of the action of one of the potentiometers in response to movement of its control lever. Leads 36 and 37 represent the input from exciter generator 17 which connect at 38 and 39 and are separated from each other by an equal resistance as in rheostat sections 40 and 40a, although these resistances need not be symmetrically arranged as shown in the schematic. Contactors 41 and 42 mounted on the disc 40a of insulating material include output leads 43 and 44 to deliver the resulting current from the resistances to the generator field winding, assuming this schematic to be the left one, would be field 22. It will be seen that the negative current coming in through lead 37 will take the path of least resistance and travel clockwise around the ring of resistances in section 40a until it reaches contactor 41, from whence it will pass into output lead 43 and be delivered to the generator field 22. We are assuming here, as modern tests have, that electricity flows from minus to plus, in which case the returning current may be thought of as passing through lead 44 into contactor 42 and then counterclockwise around the resistances 40 until it reaches terminal 38 from which it completes the cycle to the exciter generator by means of lead 36. This will cause generator field 22 to have a certain polarity and the polarity of the output current of the armature 26 will be determined thereby as will the ultimate direction of rotation of wheels 3 on the left side of the vehicle. Now as handle 35 is moved rearward until contactor 41 passes the resistance center C, the amount of resistance between its new position 45 and terminal 39 is now greater than the resistance from 45 and terminal 38, and also greater than the resistance from terminal 39 to the new position 46 of the other contactor 42. Since electricity will take the path of least resistance, the circuit now becomes minus from input lead 37 through output lead 44 and positive from output lead 43 through input return lead 36. This ultimately causes a reverse rotation of the wheels.

It is well known that a generator field which has been supplied direct current of one polarity will maintain a certain amount of residual magnetism of a corresponding polarity after the D. C. supply is withdrawn. This residual magnetism will present a counterforce to the establishment of magnetism of a reverse polarity by introduction of a D. C. supply of a reverse polarity. In the invention at hand this will have the effect of a sluggish reaction of the motors 10 and 10a which are supplied with current from the generator 16. In order to overcome this tendency, alternating current is momentarily circulated through the generator field to neutralize any residual magnetism therein, by the means herein described:

A. C. contacts 47 and 48 have been installed on the underside of contactors 41 and 42. Corresponding contacts 49 and 50 are placed on the center line of the potentiometer so that when the contactors are in their neutral position C, these A. C. contacts will be engaged. The stationary contacts 49 and 50 are connected by leads 51 and 52 to a suitable single-phase A. C. supply.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

We claim:

1. In combination, a tractor including a main frame, individual electrically operated wheel drivers mounted on the frame, wheels driven by said drivers, an engine supported by the frame, a pair of generators driven by the engine, an exciter driven by said engine, a single field winding for each generator, current reversing and current amplitude controlling means connected between said exciter and a corresponding generator field winding for reversing and controlling the amplitude of the current through the corresponding winding, and each of said current reversing and current amplitude controlling means including a single control element controlling a corresponding one of said current reversing and current amplitude controlling means for supplying electric current of different polarity and of different amplitude from the generators to the wheel drivers on each side of the tractor selectively.

2. In combination, a tractor including a main frame, individual electrically operated wheel drivers mounted on the frame, wheels driven by said drivers, an engine supported by the frame, a pair of generators driven by the engine, each of said generators having an armature and a single field winding, an exciter, current reversing and current amplitude controlling means connected between said exciter and both generator field windings for reversing and controlling the amplitude of the current flow through the windings, means connecting the armature of a corresponding generator to a corresponding one of said wheel drivers for energizing and driving the same individually, and each of said current reversing and amplitude controlling means including a single control element controlling the corresponding one of said current reversing and amplitude controlling means, said control element of each current reversing means being rotatably mounted about substantially the same axis and being disposed generally in side-by-side relationship.

3. In a tractor including a frame, an engine on the frame, electric wheel drivers attached to the frame, wheels attached to and driven by said drivers, a generator driven by said engine, said generator including two armatures on a single shaft and a single field for a corresponding armature, an exciter for said generator, means connecting a corresponding armature to a corresponding one of said wheel drivers for energizing and driving the same selectively, an electric steering system comprising a pair of two circuit current reversing and current amplitude controlling potentiometers with a control lever for each one of said pair, each of said potentiometers being connected in an electrical circuit between a corresponding generator field winding and said exciter to reverse and control the amplitude of the current from the exciter to each field winding selectively.

4. In a tractor, an electric steering system comprising: an electric generator with two armatures on its shaft and a separate single field winding for each armature, each of said generator armatures supplying current to one side of the tractor, an exciter for said generator, a potentiometer including two rheostats inserted in the steering system between said exciter and a corresponding generator field winding for reversing and controlling the amplitude of the current flow through the corresponding field winding, a right and left lever for controlling said rheostats, electrically driven wheels on each side of the tractor, the right lever operative to increase or decrease resistance within one rheostat so as to control its output current to one field winding, said armature corresponding to said one field winding operative to furnish current to operate said electrically driven wheels on the right side only, said left lever operative in the same manner as said right lever in respect to the left side wheels.

5. In a tractor, including a main frame, wheels supporting said frame, electric wheel drivers on said frame, an engine on said frame, and a D. C. generator driven by said engine, a D. C. electric steering system comprisign two control levers, two circular rheostats, each having a corresponding one of said two levers, positive and negative input leads attached to each rheostat, said leads separated from each other by an equal series of resistance, a pair of diametrically opposed contactors concentric with each rheostat, each one of said levers being operative to rotate each corresponding pair of contactors around its corresponding rheostat selectively, a positive and negative output lead associated with each pair of contactors, a point of balanced resistance on the corresponding circular rheostat arranged to cause said output leads to reverse polarity and control the amplitude of current flow when said contactors pass this said point, said output leads of each pair of contactors serving to supply current of different polarity and different amplitude to the wheel drivers on one side of the tractor only, the side thus supplied controlled by a corresponding lever.

References Cited in the file of this patent

UNITED STATES PATENTS

| | | |
|---|---|---|
| 670,278 | Hughes | Mar. 19, 1901 |
| 2,039,513 | Baker | May 5, 1936 |
| 2,082,001 | Hanson | June 1, 1937 |
| 2,120,100 | Illgen | June 7, 1938 |
| 2,405,636 | Beck | Aug. 13, 1946 |
| 2,698,919 | LeTourneau et al. | Jan. 4, 1955 |

FOREIGN PATENTS

| | | |
|---|---|---|
| 284,493 | Germany | May 31, 1915 |